US008896954B2

(12) United States Patent
Cherubini et al.

(10) Patent No.: US 8,896,954 B2
(45) Date of Patent: Nov. 25, 2014

(54) LONGITUDINAL POSITION INFORMATION ON A MAGNETIC TAPE MEDIA

(71) Applicant: International Business Machines Corporation, Armonk, NY (US)

(72) Inventors: Giovanni Cherubini, Rueschlikon (CH); Roy D. Cideciyan, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 13/645,931

(22) Filed: Oct. 5, 2012

(65) Prior Publication Data

US 2013/0107393 A1    May 2, 2013

(30) Foreign Application Priority Data

Oct. 28, 2011  (EP) .................................. 11187120

(51) Int. Cl.
*G11B 20/12* (2006.01)
*G11B 5/584* (2006.01)

(52) U.S. Cl.
CPC .... *G11B 20/1201* (2013.01); *G11B 2020/1265* (2013.01); *G11B 5/584* (2013.01); *G11B 2020/1281* (2013.01); *G11B 2020/1287* (2013.01)
USPC ........................................... 360/49; 360/72.2

(58) Field of Classification Search
None
See application file for complete search history.

(56) References Cited

U.S. PATENT DOCUMENTS

| 5,923,272 | A * | 7/1999 | Albrecht et al. ........... 360/77.12 |
| 5,930,065 | A * | 7/1999 | Albrecht et al. ............. 360/72.2 |
| 6,075,666 | A   | 6/2000 | Gillingham et al. |
| 7,421,640 | B2 * | 9/2008 | Cideciyan et al. ............ 714/771 |
| 7,522,371 | B2  | 4/2009 | Koski et al. |
| 7,535,668 | B2 * | 5/2009 | Bates et al. ................. 360/77.12 |
| 7,538,969 | B2 * | 5/2009 | Weber et al. ................ 360/77.12 |
| 7,787,204 | B2 * | 8/2010 | Cherubini et al. .......... 360/77.12 |

(Continued)

FOREIGN PATENT DOCUMENTS

| EP | 0940812 A2 | 9/1999 |
| WO | 2007020123 A1 | 2/2007 |
| WO | 2009103675 A1 | 8/2009 |

OTHER PUBLICATIONS

HP Invent, "hp StorageWorks Ultrium 460—Technical White Paper," hp storage, hp Ultrium 2 technical white paper; pp. 1-17, Nov. 2002.

(Continued)

*Primary Examiner* — Wayne Young
*Assistant Examiner* — James L Habermehl
(74) *Attorney, Agent, or Firm* — Cantor Colburn LLP (57) ABSTRACT

A magnetic tape media for storing data includes at least one servo band extending along the magnetic tape media and having servo information encoded by an M-ary alphabet A comprising M>2 different symbols and is arranged in a set of words. Each word of the set of words contains synchronization information, wherein each symbol used for representing the synchronization information is from a set B of m symbols, which set B is a proper subset of the symbols in the alphabet A such that $1 \leq m < M$; longitudinal position information, wherein each symbol used for representing the longitudinal position information is from a set C of M-m symbols, which set C is a complementary set to set B; and other information, wherein each symbol used for representing the other information is from the set C of M-m symbols.

16 Claims, 3 Drawing Sheets

(56) References Cited

U.S. PATENT DOCUMENTS

| | | | |
|---|---|---|---|
| 7,813,070 B2 * | 10/2010 | Cideciyan et al. | 360/53 |
| 7,898,763 B2 * | 3/2011 | Kabelac | 360/77.12 |
| 7,957,089 B2 | 6/2011 | Kabelac | |
| 7,961,424 B2 | 6/2011 | Cherubini et al. | |
| 8,027,111 B2 * | 9/2011 | Cideciyan et al. | 360/39 |
| 8,112,696 B2 * | 2/2012 | Cideciyan et al. | 714/785 |
| 8,185,803 B2 * | 5/2012 | Cideciyan et al. | 714/771 |
| 8,271,857 B2 * | 9/2012 | Kabelac et al. | 714/771 |
| 8,325,439 B2 * | 12/2012 | Kabelac | 360/77.12 |
| 8,615,689 B2 * | 12/2013 | Kabelac et al. | 714/711 |
| 2009/0287982 A1 | 11/2009 | Kabelac et al. | |
| 2009/0316773 A1 | 12/2009 | Cideciyan et al. | |
| 2010/0079890 A1 | 4/2010 | Brummet | |
| 2011/0102927 A1 | 5/2011 | Cherubini et al. | |

OTHER PUBLICATIONS

ECMA, "Data Interchange on 12,7 mm-384-Track Magnetic Tape Cartridges—Ultrium-1 Format," Standard ECMA-319—Standardizing Information and Communication Systems, Jun. 2001, pp. 1-160.

UK Combined Search and Examination Report under Sections 17 and 18(3); Application No.: GB1212274.3; Date Mailed: Nov. 9, 2012; pp. 1-7.

* cited by examiner

|  | L0(n):= | L1(n):= |
|---|---|---|
| If L0(n)=0 | L0(n) | L1(n) |
| If L0(n)=1 | L0(n) | L2(n) |
| If L0(n)=2 | L0(n) | L3(n) |
| If L0(n)=3 | L0(n) | L4(n) |
| If L0(n)=4 | L0(n) | L5(n) |
| If L0(n)=5 | L0(n) | L6(n) |
| If L0(n)=6 | L0(n) | L7(n) |

FIG. 3

| | | L0(n):= | L1(n):= | | | | |
|---|---|---|---|---|---|---|---|
| If L0(n)=0 | $S_y$ | L0(n) | L1(n) | P1(n) | .. | P2$^q$-2 (n) | $T_x$(n) |
| If L0(n)=1 | $S_y$ | L0(n) | L2(n) | | | | $T_x$(n) |
| If L0(n)=2 | $S_y$ | L0(n) | L3(n) | | | | $T_x$(n) |
| ... | | | | | | | |
| ... | | | | | | | |
| ... | | | | | | | |
| If L0(n)=2$^q$-2 | $S_y$ | L0(n) | L2$^q$-2 (n) | P1 (n) | .. | P2$^q$-2 (n) | $T_x$(n) |

LONGITUDINAL POSITION INFORMATION ON A MAGNETIC TAPE MEDIA

PRIORITY

This application claims priority to European Patent Application No. 11187120.8, filed 28 Oct. 2011, and all the benefits accruing therefrom under 35 U.S.C. §119, the contents of which in its entirety are herein incorporated by reference.

BACKGROUND

The present disclosure relates to a magnetic tape media for storing data, to a method for writing servo information to a magnetic tape media, to a method for reading servo information from a magnetic tape media, to an apparatus for writing servo information to a magnetic tape media, to an apparatus for reading servo information from a magnetic tape media, and to a related computer program product.

Storage media typically comprise servo information prerecorded in one or more of dedicated servo bands that extend next to data tracks for storing data, which servo bands extend in a longitudinal direction along the tape. A servo band typically is read by a dedicated servo reader of a tape head of a tape drive, into which a cartridge containing the tape media is inserted to. The read servo information allows for determining a lateral deviation of the tape from a lateral reference position, which lateral reference position is desired for correctly reading data from and writing data to the tape by dedicated read and write elements of the tape head. A position error signal supplied by the servo reader may be translated into a control signal for an actuator for controlling the lateral position of the tape head with respect to the tape.

Timing-based servo (TBS) is a technology developed specifically for linear tape drives in the late '90s. In TBS systems, recorded servo patterns comprise transitions with two different azimuthal slopes. The tape head lateral position is derived from the relative timing of pulses generated by a servo reader reading the servo pattern. The servo patterns are written on five dedicated servo bands that straddle four data bands. The complete format for linear tape open (LTO) tape drives of the first generation was standardized by the European Computer Manufacturers Association (ECMA) in 2001 as ECMA-319.

BRIEF SUMMARY

In one embodiment, a magnetic tape media for storing data, comprising at least one servo band extending along the magnetic tape media and comprising servo information for allowing to determine a lateral deviation of a servo reader reading the servo information from a lateral reference position on the servo band; additional information integrated into the servo information, which additional information is encoded by an M-ary alphabet A comprising M>2 different symbols, is arranged in a set of words, and wherein each word of the set of words contains: synchronization information, wherein each symbol used for representing the synchronization information is from a set B of m symbols, which set B is a proper subset of the symbols in the alphabet A such that $1 \le m < M$; longitudinal position information, wherein each symbol used for representing the longitudinal position information is from a set C of M-m symbols, which set C is a complementary set to set B; and other information, wherein each symbol used for representing the other information is from the set C of M-m symbols.

In another aspect, a method for encoding a magnetic tape media includes writing servo information to one or more servo bands of the magnetic tape media, using at least one servo band extending along the magnetic tape media, the servo information configured allow determination of a lateral deviation of a servo reader reading the servo information from a lateral reference position on the servo band; and integrating additional information into the servo information, which additional information is encoded by an M-ary alphabet A comprising M>2 different symbols, is arranged in a set of words, and wherein each word of the set of words contains: synchronization information, wherein each symbol used for representing the synchronization information is from a set B of m symbols, which set B is a proper subset of the symbols in the alphabet A such that $1 \le m < M$; longitudinal position information, wherein each symbol used for representing the longitudinal position information is from a set C of M-m symbols, which set C is a complementary set to set B; and other information, wherein each symbol used for representing the other information is from the set C of M-m symbols.

In another aspect, a method for reading servo information from a magnetic tape media includes determining a lateral deviation of a servo reader reading the servo information from a lateral reference position on the servo band; repositioning the servo reader on the lateral reference position by repositioning a tape head comprising the servo reader; demodulating additional information read by the servo reader; and decoding a longitudinal position value out of the synchronized additional information; wherein the additional information is encoded by an M-ary alphabet A comprising M>2 different symbols, is arranged in a set of words, and wherein each word of the set of words contains: synchronization information, wherein each symbol used for representing the synchronization information is from a set B of m symbols, which set B is a proper subset of the symbols in the alphabet A such that $1 \le m < M$; longitudinal position information, wherein each symbol used for representing the longitudinal position information is from a set C of M-m symbols, which set C is a complementary set to set B; and other information, wherein each symbol used for representing the other information is from the set C of M-m symbols.

BRIEF DESCRIPTION OF THE SEVERAL VIEWS OF THE DRAWINGS

Referring to the exemplary drawings wherein like elements are numbered alike in the several Figures.

DETAILED DESCRIPTION

As an introduction to the following description, a general aspect of the disclosure concerns a servo format to be used in a tape storage system in which additional information is encoded by means of a multilevel alphabet. In this respect, the multilevel alphabet is defined to comprise more than two symbols, for example three, four, six or eight symbols. The additional information includes information as to a longitudinal position—also abbreviated as LPOS—of the tape media. As a result, an LPOS word specification is disclosed in which a first set of symbols from the multilevel alphabet is reserved for defining a frame synchronization pattern. A second set of symbols from the multilevel alphabet, which second set is disjoint with respect with the first set of symbols, is used for encoding the LPOS information, and, in addition for encoding other information such as manufacturing information.

Specifically, a word in accordance with such format comprises x symbols which x symbols comprise:

p consecutive symbols assigned to synchronization information, i.e. symbols $S_0, \ldots, S_{p-1}$, or, in another notation symbols $S_i$ with $0 \leq i < p$, k consecutive symbols assigned to LPOS information, i.e. symbols $L_0, \ldots, L_{k-1}$, or, in another notation symbols $L_i$ with $0 \leq i < k$, and j consecutive symbols assigned to other information, i.e. symbols $T_0, \ldots, T_{j-1}$, or, in another notation symbols $T_i$ with $0 \leq i < j$.

The number of symbols forming a word is $x=p+k+j$. In one example, the symbols of a word span consecutive servo frames. Specifically, all symbols are from an M-ary alphabet A and $M>2$. The symbols $S_i$ used for describing synchronization information are all from a set B of symbols with m elements and B being a proper subset of A, i.e., $1 \leq m < M$. The symbols L used for describing LPOS information are all from a set C of symbols with M-m elements and C being a proper subset of A, i.e., $1 \leq (M-m) < M$, and C being a set complementary to set B. This means that the M symbols of the alphabet A is the union of the set of symbols B and the set of symbols C. An intersection of the sets B and C is an empty set. The symbols $T_i$ used for other information are all from the set C of symbols. Hence, the disclosed word specification efficiently embeds a unique synchronization pattern as well as LPOS and other information. Consequently, a high resolution of the longitudinal position estimate is achieved.

Storage media typically comprise servo information pre-recorded in one or more of dedicated servo bands that extend next to data tracks for storing data, which servo bands extend in a longitudinal direction along the tape. For example, five dedicated servo bands are provided on a tape media which five servo bands straddle four data bands comprising multiple data tracks. A servo band on a tape media of a tape cartridge typically is read by a dedicated servo reader of a tape head of a tape drive. The read servo information allows for determining a lateral deviation of the tape from a lateral reference position, which lateral reference position is desired to be maintained throughout operation of the tape drive for correctly reading data from and writing data to the tape by dedicated read and write elements of the tape head. A position error signal (PES) supplied by the servo reader may be translated into a control signal for an actuator for controlling the lateral position of the tape head with respect to the tape.

In one example, a timing-based servo (TBS) approach is used. The TBS approach makes use of scanning servo bursts sequentially arranged along a servo band. Each servo burst may include a pattern that extends throughout a width of the servo band and in addition shows an asymmetry both with respect to a longitudinal centerline of the servo band and with respect to a lateral axis such that for each position of the servo reader being laterally offset from its reference position pulses in the position error signal show up at different times with respect to a pulse that would originate from a servo reader being positioned in its reference position. In one example, by means of evaluating an interval between pulses generated by the servo reader, a lateral deviation of the servo reader from its reference position, and as such a deviation of the entire tape head relative to the tape media, may be determined. In this context, a timing based evaluation of the position error signal supplied by the servo reader is performed by evaluating the relative timing of pulses. In one example, the servo information is arranged into multiple servo frames extending sequentially along the servo band, each servo frame comprising a servo pattern.

Each servo frame may include multiple servo bursts, with each servo burst comprising a servo sub-pattern. In an exemplary embodiment, a servo sub-pattern consists of a set of parallel stripes of magnetic transitions, wherein the set of stripes extends along the width of the servo band and is inclined by an angle $+\alpha$ or $-\alpha$ with respect to the lateral axis. In one example, the set of stripes of consecutive servo bursts are not in parallel to each other, but one set of stripes is inclined by an angle $+\alpha$ while the next set of stripes is inclined by an angle $-\alpha$. In an exemplary embodiment, a servo frame includes four servo bursts wherein the first and the third servo bursts comprise stripes in parallel to each other and wherein the second and the fourth servo bursts comprise stripes in parallel to each other. However, the stripes of neighboring servo bursts are not parallel to each other.

Specifically, a single symbol of the M-ary alphabet A is encoded per servo frame. Therefore for encoding a word according to the format introduced, x servo frames are used. Within a servo frame, the symbol may be encoded redundantly in more than one servo burst, or may not be encoded redundantly on a servo burst basis such that only a single burst holds the encoded information. In the specific embodiment introduced above wherein the servo frame comprises four servo bursts, only in two consecutive servo bursts, and in the first two servo bursts the symbol may be encoded. However, other encoding configurations within a servo frame may be possible. Within a servo burst, and provided that a servo burst holds a sub-pattern in form of a set of stripes, only a subset of the set of stripes may be used for encoding a symbol. In one embodiment, a single stripe of the set of stripes may be used for encoding a symbol. In another embodiment, multiple stripes, e.g., two stripes out of the set of stripes may be encoded with a symbol, and all these stripes may be encoded by the same symbol which is the single symbol encoded in the present servo frame. Encoding a symbol redundantly into multiple stripes and/or into multiple servo bursts further improves reliable decoding of such symbol.

An exemplary technique of encoding a symbol into a stripe of a servo burst may be a pulse position encoding. In such encoding technique, the stripe may be arranged offset from its regular position in order to represent one of the symbols of the alphabet, but which stripe still is arranged in parallel with the other stripes of the set of stripes. Hence, such stripe may lower its distance towards one of its neighboring stripes and increase its distance to the other one of its neighboring stripes with respect to its regular position and provided that all stripes of the set of stripes are equally spaced when being in a regular position. A multilevel encoding technique may now, for example, make use of multiple offset positions allowed for a stripe for representing different symbols of the alphabet. Such offset positions may in a first embodiment include offset positions towards a single one of its neighboring stripes only, while in another embodiment, offset positions of the subject stripe may be allowed in both directions, i.e. towards both of its neighboring stripes. A regular position of the subject stripe, i.e. a non-offset position, may or may not represent a symbol of the alphabet.

In the exemplary embodiment of a servo frame comprising four servo bursts, the first two servo bursts may include five stripes each, while the second the second two servo bursts may include four stripes each. The symbol is encoded in the first two servo bursts with the five stripes, wherein the second and the fourth stripe of such set of stripes are used for encoding the symbol. Hence, the same symbol is encoded in the position of the second and the fourth stripe of the first two servo bursts each, such that the same symbol is encoded four times per servo frame for increasing redundancy.

Integrating LPOS information into the servo information represented by servo patterns on dedicated servo bands allows reading and decoding such LPOS information by the servo reader during operation of the tape drive. Hence, the longitudinal position of the tape media presently read may be identified based on the LPOS information read by the servo reader. This LPOS information may be used for winding the tape media to a given longitudinal position and, for example, starting reading or writing at such specified longitudinal position. Other information such as manufacturing information may be added too, which, for example, may indicate the manufacturer of the tape cartridge, the date of manufacturing the tape cartridge, information as to the standard the present cartridge may conform to, etc.

The synchronization information may allow for detecting the beginning of a new word and may be needed for correctly interpreting the LPOS information. In one example, a synchronous servo channel is used for detecting the servo patterns. A matched-filter interpolator/correlator may be employed which ensures that an optimum filtering of the servo reader signal is performed not only at constant tape velocity, but also during acceleration and deceleration. A synchronous servo channel thus guarantees an optimum processing of a servo signal for the generation of head lateral position estimates, velocity estimates, and LPOS information.

The encoding of additional information into the servo information according to the above embodiments still allows the servo patterns to generate a reliable position error signal (PES) which provides all information required for determining a lateral offset of the tape with respect to the tape head. The present idea of a tape media and an LPOS word format is designed towards an optimization of a servo pattern geometry which in turn is important in order to achieve a maximum overall system performance, including a minimization of the standard deviation of a position error signal, a maximization of a parameter update rate to increase a control system bandwidth, and also an optimization of a rate of information embedded in the modulated servo sub-patterns, all at high areal densities.

In the figures, same or similar elements are denoted by the same reference signs.

Figure 1:
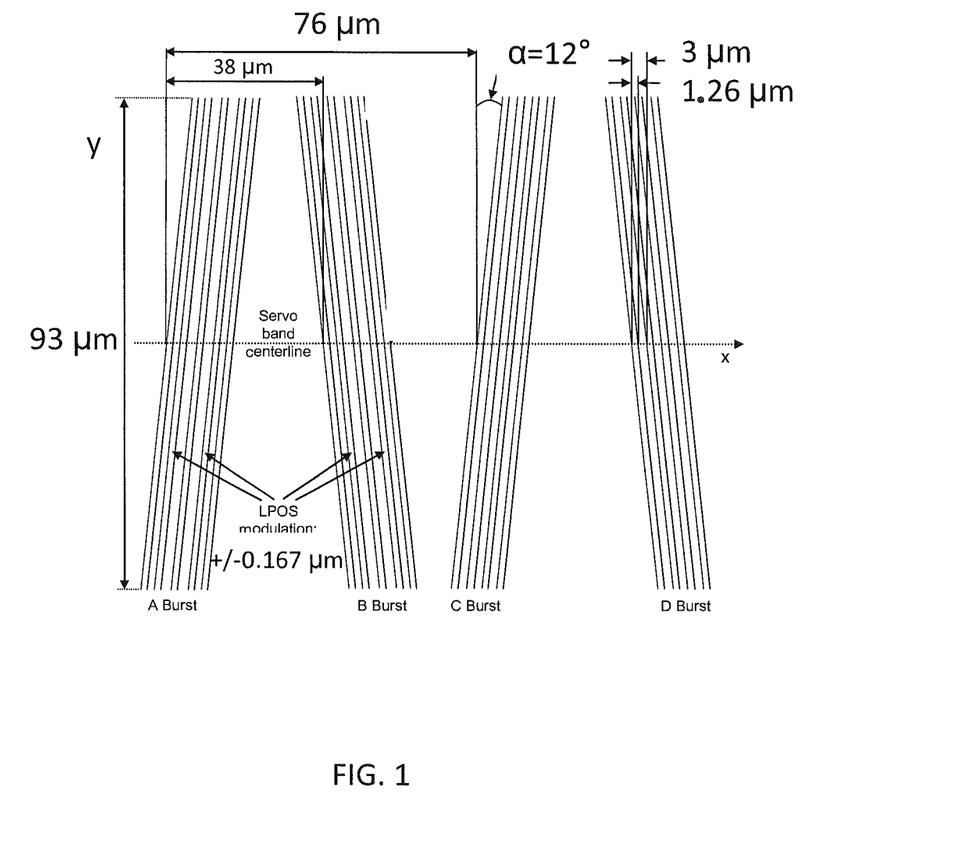
FIG. 1 is a first example of an encoded servo frame as used in an embodiment of the present disclosure.

FIG. 1 illustrates a single servo frame of a servo band written to a tape media. A longitudinal extension of the specific servo band and the tape media in general extends along the axis x. In the present example, the axis x coincides with the servo band centerline, i.e. the longitudinal center of the servo band which in the present example also coincides with the lateral reference position which is the desired position for the servo reader, i.e. its position where no lateral actuation of the tape head is required. A lateral extension of the servo band and the tape media in general is given by lateral axis y. Hence, a width of the servo band and the servo frame may, for example, be 93 microns ($\mu m$). A length of the entire servo frame is 152 $\mu m$. The servo frame includes four servo bursts A, B, C and D.

The servo sub-patterns of the A- and B-bursts comprise five stripes each, whereas the servo sub-patterns of the C- and D-bursts include four stripes each. The stripes of the A-burst and the C-burst are arranged in parallel, and the stripes of the B-burst and the C-burst are arranged in parallel. The stripes of the A-burst and the C-burst are inclined by an angle α of +12° degrees with respect to the lateral axis y, and the stripes of the B-burst and the D-burst are inclined by an angle α of −12° degrees with respect to the lateral axis y. A stripe comprises a magnetic orientation different to its surrounding such that a stripe denotes a transition in magnetic orientation. A stripe width of 1.26 $\mu m$ may be used, for example, and the distance between stripes of the same servo burst may, for example, be 3 $\mu m$, and the servo band width may be 93 $\mu m$.

In the present example, a pulse position modulation (PPM) is used. The stripes the modulation is applied to are the second and fourth stripes of each of the A- and B-burst servo sub-patterns. A modulation that represents one of the M symbols of the alphabet A may, for example, show an offset of the subject stripe (which offset is also denoted as modulation depth) of, e.g., 0.167 $\mu m$. In the present example, the symbol is encoded by modulating the pulse position of the second stripe in the A-burst by −0.167 $\mu m$ and simultaneously modulating the pulse position of the fourth stripe in the A-burst by +0.167 $\mu m$. The same encoding is repeated in the B-burst. An LPOS word in the present example may, for example, contain 36 symbols represented by 36 servo frames, and may provide information on a specific absolute longitudinal address. Therefore, an LPOS word may appear every 5.47 mm down the tape media, i.e., once every 36 servo frames, each of which is 152 $\mu m$ long and encodes 1 symbol of information.

Figure 2:
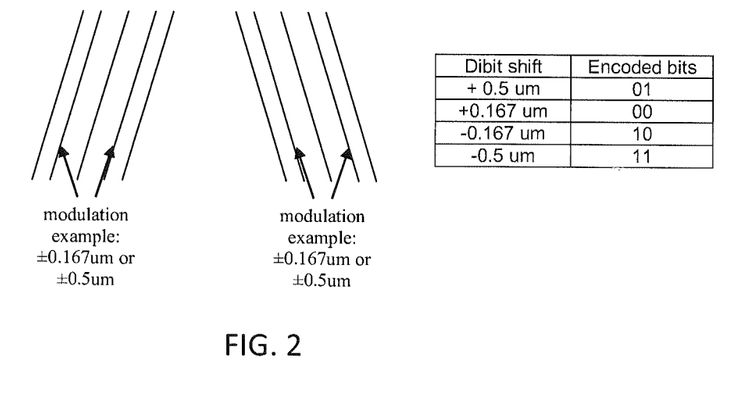
FIG. 2 is a second example of an encoded servo frame as used in an embodiment of the present disclosure.

FIG. 2 illustrates in a schematic way a servo frame including the same servo information as is shown in FIG. 1. In this example, a quaternary pulse position modulation is used to encode such that the alphabet A consists of four symbols. The modulation of the stripes, i.e. the offset of a subject stripe from its non-modulated center position in which a distance to both of its neighboring stripes is equal, may be defined as ±$\Delta s1$=0.167 $\mu m$ and ±$\Delta s2$=0.5 $\mu m$, assuming that the zero-shift position. i.e. the default position, is not used as a valid modulation level and the maximum shift is ±0.5 $\mu m$. Again, one symbol may be encoded per servo frame. The table next to the diagram in FIG. 2 shows a translation of the symbols of the alphabet A into a binary system which may be exemplary for subsequent processing. In an alternate embodiment, more than one symbol can be encoded in one servo frame, therefore increasing the resolution of the longitudinal position estimate, which is also referred to as "LPOS granularity". With an eight-ary pulse position modulation, i.e., an alphabet consisting of eight symbols, three bits are needed to represent such symbol such that encoding of one of these symbols in the servo frame is equivalent to encoding three bits per servo frame. However, such multilevel encoding technique is advantageous in that no other modifications are required with respect to a conventional LTO servo frame. It is also possible to use, e.g., six-ary pulse position modulation where six symbols/levels can be used to encode log 2(6)=2.58 bits of information. The number of symbols is determined depending on the operating point and the envisaged servo channel SNR in a tape drive.

In an exemplary embodiment, an eight-ary alphabet A is considered for encoding LPOS information, wherein the individual symbols in A={$a_0, a_1, \ldots, a_7$}. Let GF(7) be the Galois field with seven elements. In the following, the elements of GF(7) are the first seven elements of A and are represented by $a_0, a_1, \ldots, a_6$ which in binary representation may be translated into three bits by using table look-up. The Galois field in this example would represent a set C of symbols, which set C is a proper subset of the alphabet A. In this example, the symbol $a_7$ in alphabet A does not belong to GF(7). For the purpose of frame synchronization, the excluded symbol $a_7$ is used as the sync mark Sy, such that Sy can only occur at the beginning of an LPOS word. Hence, the symbol $a_7$ represents a set B which set B is a subset of alphabet A and is a complementary set to set C wherein a union of the symbols in the sets B and C results in the alphabet A, and wherein the intersection of the symbols in the sets B and C is an empty set.

In the considered servo format with symbols from alphabet A, each servo frame encodes one symbol. An LPOS word has a length of 10 servo frames and is defined as a sequence of symbols:

Sy, L0, L1, L2, . . . , L7, Tx.

Here, the symbol Sy is the sync mark representing synchronization information and takes the first position in the word, while symbols L0, . . . , L7 encode LPOS information and take the following eight positions in the word, and symbol Tx encodes other information such as manufacturing specific information and takes the last position in the word.

In an embodiment where the symbols L0, . . . , L7 represent longitudinal position information in form of absolute longitudinal position values which denote the longitudinal position of the tape media which is currently read and which position is encoded in a single word, the current LPOS value which is the LPOS value at present time n is expressed as:

$$LPOS(n) = \sum_{i=0}^{7} L_i(n)7^i;$$

which expression is based on a positional notation with the basis of 7 since seven symbols are assembled in set C. $L_i$ is a coefficient for the respective position, such that $L_0$ and $L_7$ are the least and the most significant symbols in longitudinal position, respectively. Note that the maximum number of LPOS values that can be represented in this notation is $7^8=5764801$ while today's LTO cartridges span a range of about 100000 consecutive LPOS values.

In the above embodiment, the LPOS values are not further encoded but are written to the respective frames. By definition, every such LPOS value is incremented by one—or decremented by one if the tape moves in the backward direction—with respect to the previous LPOS value written to the previous word. This may provide a large inherent redundancy in the overall sequence of LPOS values from a beginning of the tape to an end of the tape. In an exemplary embodiment, an efficient compression scheme may be introduced. The compression step in this exemplary embodiment of the word format making use of the efficient scheme may be defined as follows with respect to FIG. 3 in which the number of symbols used for LPOS encoding is reduced in the above example from eight to two, or more generally from k1 denoting the number of symbols required for encoding uncompressed LPOS values down to k denoting the number of symbols required for encoding compressed longitudinal position information.

Figure 3:
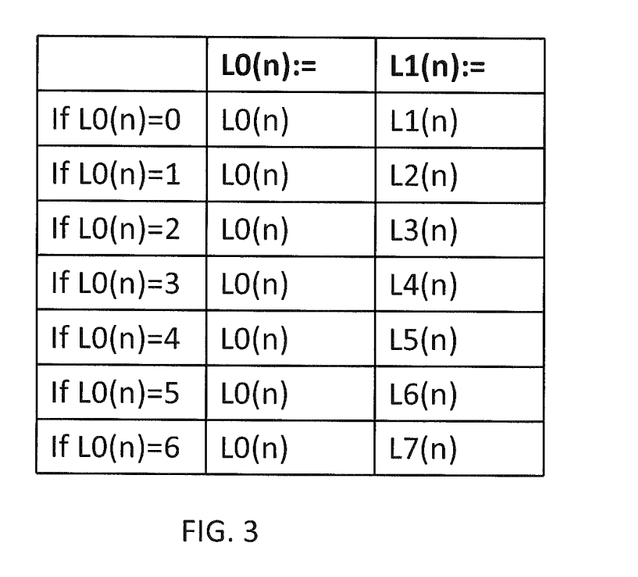
FIG. 3 is a compression table for use in an embodiment of the present disclosure.

The compression table in FIG. 3 is constructed by assuming an alphabet A with 8 symbols, a subset C with M-m=7 symbols for encoding longitudinal position information, and an uncompressed LPOS value with eight symbols; the compression rule reads as follows: If the symbol L0(n) in the present LPOS word is equal to 0, only the two symbols L0(n) and L1(n) in the first row of the table represent the symbols in the present LPOS word, i.e., LPOS(n), after having applied compression; if the symbol L0(n) in the present LPOS word is equal to 1, only the two symbols L0(n) and L2(n) in the second row of the table represent the symbols in the present LPOS word, i.e., LPOS(n), after having applied compression; and so on. The first column indicates the symbol L0(n) in the present LPOS word, which is always included in the compressed LPOS word, whereas the second column specifies the selection of the second symbol in the compressed LPOS word, which depends on L0(n). Such compression encoding, for example, selects the symbols L0(n) and L5(n) of the uncompressed format, i.e. the first and the sixth symbol of the uncompressed LPOS word consisting of eight symbols in the above example, in case the first symbol of the uncompressed LPOS word is symbol 4. As a result, instead of generating an LPOS word with L0(n), L1(n), L2(n), L3(n), L4(n), L5(n), L6(n), L7(n), only L0(n), L5(n) of the uncompressed format builds the compressed LPOS word.

In other words, only a subset of two symbols from GF(7), out of the eight 8-ary symbols from alphabet A defining an LPOS value, are associated with the LPOS value for a specific LPOS word. This corresponds to a fixed compression ratio of $R_{comp}=4$. A compressor for implementing such compression may be embodied as a block encoder, whereas a decompressor may be embodied as a sliding-block decoder with a window size of fourteen symbols from GF(7), which corresponds to seven LPOS words. Hence, in the present example, a sequence of the last seven consecutive compressed LPOS words are needed to reconstruct the current LPOS value. Once an LPOS value has been reconstructed, the knowledge of the following compressed LPOS word is sufficient to obtain the next LPOS value.

According to another embodiment of the present disclosure, error correction coding (ECC) may be applied to either an uncompressed LPOS value or to compressed longitudinal position information. In practice, a servo band may have suffered damage for a short stretch of tape, or may not deliver useful information due to media defects. Therefore, errors in an LPOS word in such exemplary embodiments are tolerated in order not to interrupt the operation of the tape drive, especially while writing data on the tape. In other words, a robustness of LPOS words to multiple errors is desirable in order to reduce a rate of occurrence of stop-write events.

Assuming an alphabet A with 8 symbols, a subset C with M-m=7 symbols, and an uncompressed LPOS value with eight symbols, an error-correction-encoding step in such exemplary embodiment of the servo format making use of an efficient scheme is defined as follows:

Instead of an uncompressed LPOS value with symbols L0(n), L1(n), L2(n), L3(n), L4(n), L5(n), L6(n), L7(n), now the eight positions representing LPOS information are assigned as follows: C0(n), C1(n), P1(n), P2(n), P3(n), P4(n), P5(n), P6(n).

C0(n) and C1(n) may be the two eight-ary symbols from GF(7) that represent a compressed LPOS word according to the table in FIG. 3, while P1(n) to P6(n) are six symbols from GF(7), that represent parity symbols of a doubly extended Reed-Solomon (RS) code over GF(7) with N=8, K=2, and ECC capability of correcting up to t=3 symbols. The RS code rate is $R_{ECC}=2/8=0.25$, and modulo-7 arithmetic is used in the RS encoder and decoder. Therefore, the overall rate of the compression/error-correction-coding scheme is $R_{total}=R_{comp} R_{ECC}=1$.

The overall LPOS word is thus given by

Sy, C0(n), C1(n), P1(n), P2(n), P3(n), P4(n), P5(n), P6(n), Tx(n).

Note that according to the above compression method C0(n):=L0(n) for each LPOS word, whereas C1(n):=Li(n), where i depends on the value of C0(n).

The above procedure for the definition of an LPOS word using a multi-level alphabet can be generalized as follows.

Let $GF(2^g-1)$ be a Galois field with $2^g-1$ elements. Since the only consecutive powers (excluding 0 and 1) are $8=2^3$ and $9=3^2$, $GF(2^g-1)$ exists, if and only if $2^q-1$ is a prime number p, e.g., q=3 or q=5. Consequently, simple modulo-p arithmetic can be used for encoding and decoding operations. The case q=3, p=7, corresponds to the above embodiment. In the following, the elements of $GF(2^g-1)$ are represented by $0, 1, \ldots, 2^q-2$, or by q bits using table look-up. For example, either the all-zero or the all-one q-bit symbol can be excluded. In general, for the purpose of frame synchronization the excluded symbol may be embedded in the sync symbol Sy and the sync symbol Sy may only occur at the beginning of an LPOS word. For example, repetition of the excluded symbol may be considered to improve the reliability of frame synchronization.

Figure 4:
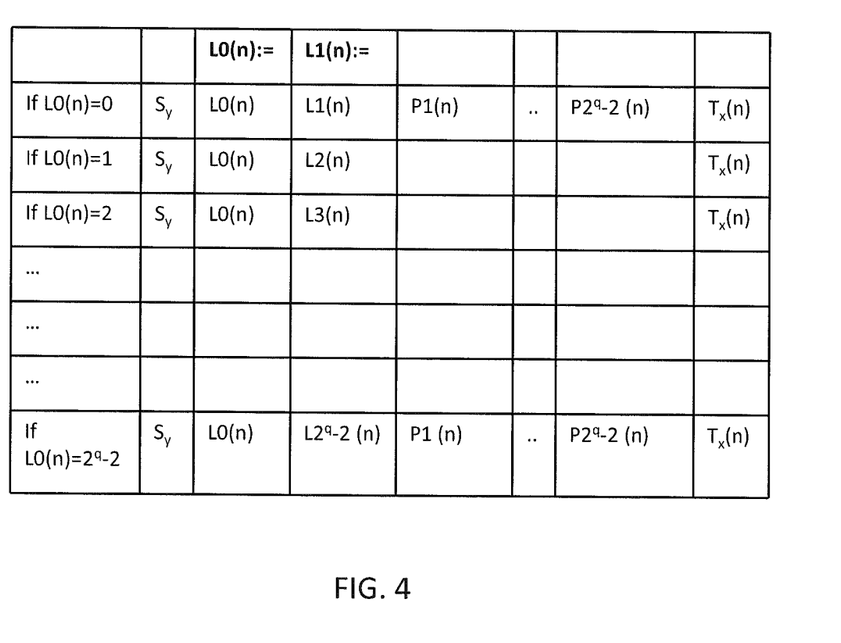
FIG. 4 is another compression table for use in an embodiment of the present disclosure.

The generalized LPOS word, where LPOS symbols $L_i(n)$, $i=0, 1, \ldots, 2^q-1$, including ECC parity symbols $P_i(n)$ also contributing to the LPOS symbols in the spirit of the claims, and, for example, manufacturing-specific symbol $T_x(n)$ are all in $GF(2^g-1)$, is defined according to the table in FIG. 4. The lossless data compression rate is $R_{comp}=2^q/2=2^{q-1}$, where a suitable compressor is a block encoder. A decompressor may be a sliding-block decoder with window size of $2(2^g-1)$ compressed symbols from $GF(2^g-1)$. As in the first exemplary embodiment, the ECC code may be a doubly extended RS code over $GF(2^g-1)$ with $N=2^q$, $K=2$, and ECC capability $t=2^{q-1}-1$ symbols. The RS code rate is $R_{ECC}=2/2^q=2^{-q+1}$, and modulo-$(2^q-1)$ arithmetic is used in the RS encoder and decoder. The overall rate of the generalized compression/error-correction-coding scheme is $R_{total}=R_{comp} R_{ECC}=1$.

In general, applying error correction coding in combination with multilevel pulse position modulation increases the robustness of detecting LPOS information in the presence of electronics noise and other disturbances.

In a further exemplary embodiment, the LPOS word using an M-ary alphabet A, where M is an integer number above two, is defined as:

Sy, L0(n), L1(n), L2(n), ..., Lk(n), Tx(n), where the (k+1) LPOS symbols Li(n), i=0, ..., k, and the manufacturing-specific symbol Tx(n) are uncoded symbols from an (M−1)-ary alphabet, and Sy is the sync mark comprising the symbol from the M-ary alphabet, which is not used to represent LPOS and manufacturing-specific symbols. This embodiment has the advantage that the first detected LPOS word immediately provides the current LPOS value, without the decoding delay required by the first embodiment. This is achieved, however, at the expense of a lower reliability of LPOS detection.

For example, assuming a servo frame having length of 100 μm and encoding an M-ary symbol, with M=8, and an LPOS word with k=7, the length of tape to "land a seek", i.e., to detect an LPOS value, is 1 mm for the uncoded LPOS case, whereas it is 7 mm for the coded LPOS case described in the above embodiments with applying compression. As a further remark, the granularity of LPOS values for both the coded and uncoded LPOS cases is equal to 1 mm, corresponding to 10 servo frame lengths. As a comparison, in today's LTO specification a length of tape of 7.2 mm is needed to "land a seek", which also corresponds to the LPOS granularity for LTO. Note that the length of tape to "land a seek" for the coded LPOS case can be significantly reduced if a less powerful ECC is adopted, so that an LPOS word length smaller than 10 is obtained. For example, if a simple rate-1/2 RS code over GF(7) with N=4 and K=2 is used, the length of tape to "land a seek" becomes 4.2 mm for a servo frame length of 100 μm, as an LPOS word is encoded by 6 servo frames. In this case the LPOS granularity is also reduced with respect to the first exemplary embodiment and is equal to 0.6 mm, which corresponds to 12× reduction in LPOS granularity with respect to LTO.

According to an embodiment of one aspect of the disclosure, a magnetic tape media for storing data is provided comprising at least one servo band extending along the magnetic tape media and comprising servo information for allowing to determine a lateral deviation of a servo reader reading the servo information from a lateral reference position on the servo band. The additional information is integrated into the servo information, which additional information is encoded by an M-ary alphabet A comprising M>2 different symbols, and is arranged in a set of words.

Each word of the set of words contains synchronization information, wherein each symbol used for representing the synchronization information is from a set B of m symbols, which set B is a proper subset of the symbols in the alphabet A such that 1≤m<M; longitudinal position information, wherein each symbol used for representing the longitudinal position information is from a set C of M-m symbols, which set C is a complementary set to set B with respect to alphabet A; and other information, wherein each symbol used for representing the other information is from the set C of M-m symbols.

In embodiments, the storage controller may comprise one or more of the following features: each word of the set of words contains a number of p symbols $S_i$ with 0≤i<p and p>0 for representing the synchronization information, which synchronization information represents a reference position within the word, each word of the set of words contains a number of k symbols L with 0≤i<k and k>0 for representing longitudinal position information, which longitudinal position information allows for deriving a present longitudinal position on the magnetic tape media, each word of the set of words contains a number of j symbols $T_i$ with 0≤i<j and j>0 for representing other information, the set C is the complementary set to set B in that the alphabet A is the union of the symbols in the sets B and C, and the intersection of the symbols in the sets B and C is an empty set; the symbols $L_0, \ldots, L_{k-1}$, represent a longitudinal position value LPOS at time n according to:

$$LPOS(n) = \sum_{i=0}^{k-1} L_i(n)(M-m)^i$$

the k symbols $L_0, \ldots, L_{k-1}$ represent a longitudinal position value in a compressed format with k<k1 and k1 being a number of symbols $L_0, \ldots, L_{k1-1}$ representing a longitudinal position value LPOS in an uncompressed format at time n according to:

$$LPOS(n) = \sum_{i=0}^{k1-1} L_i(n)(M-m)^i$$

the k symbols $L_0, \ldots, L_{k-1}$ represent a longitudinal position value in an error correction encoded format with k>k2 and k2 being a number of symbols $L_0, \ldots, L_{k2-1}$ representing a longitudinal position value LPOS in format without error correction coding applied, at time n according to:

$$LPOS(n) = \sum_{i=0}^{k2-1} L_i(n)(M-m)^i$$

the k symbols $L_0, \ldots, L_{k-1}$ represent a longitudinal position value in a compressed and error correction encoded format;

the k symbols $L_0, \ldots, L_{k-1}$ comprise q symbols required for the error correction encoding of the longitudinal position information and the other information;

the servo information is organized in servo frames arranged and repeating along the servo band, each servo frame comprises a set of servo bursts, and each servo burst comprises a set of parallel stripes each stripe being represented by two magnetic transitions, which stripes are inclined with respect to a lateral axis of the tape storage media orthogonal to its longitudinal extension;

a single symbol is encoded per servo frame, the symbol is encoded in at least one servo burst out of the set of servo bursts, and the encoding of the symbol includes a position modulation of at least one stripe out of the set of stripes of the at least one burst;

the encoding of different symbols out of the alphabet A includes a position modulation of the at least one stripe into different positions with respect to a default position of the at least one stripe;

the servo frame comprises four servo bursts, the stripes of consecutive servo bursts are inclined with a positive and a negative angle respectively with respect to the lateral axis, the symbol encoded in the servo frame is encoded into two neighboring servo bursts, and two stripes per servo burst are encoded per symbol, which two stripes are the second and the fourth stripe in the set of stripes comprising five stripes.

According to an embodiment of a further aspect of the present disclosure, a method is provided for writing servo information to a magnetic tape media according to any one of the above embodiments, wherein the servo information with the additional information integrated into the servo information is written to one or more servo bands of the magnetic tape media.

According to an embodiment of further aspect of the present disclosure, a method is provided for reading servo information from a magnetic tape media according to any one of the above embodiments, comprising determining a lateral deviation of a servo reader reading the servo information from a lateral reference position on the servo band, repositioning the servo reader on the lateral reference position by repositioning a tape head comprising the servo reader, demodulating the additional information read by the servo reader, decoding a longitudinal position value out of the synchronized additional information.

According to an embodiment of a further aspect of the present disclosure, an apparatus is provided for writing servo information to a magnetic tape media, comprising a servo writer for writing to the magnetic tape media, and a control unit for actuating the servo writer to write to the magnetic tape media according the method for writing servo information to a magnetic tape media.

According to an embodiment of a further aspect of the present disclosure an apparatus is provided for reading servo information from a magnetic tape media, comprising a servo reader for reading servo information from the magnetic tape media, and a controller for implementing the steps of the method for reading servo information from a magnetic tape media.

According to an embodiment of a further aspect, a computer program product is provided comprising a computer readable medium having computer readable program code embodied therewith, the computer readable program code comprising computer readable program code configured to perform a method for writing servo information to a magnetic tape media or a method for reading servo information from a magnetic tape media.

It is understood that method steps may be executed in a different order than listed in a method claim. Such different order shall also be included in the scope of such claim as is the order of steps as presently listed.

Embodiments described in relation to the tape storage media shall also be considered as embodiments disclosed in connection with any of the other categories such as the methods, the apparatus, the computer program product, etc.

As will be appreciated by one skilled in the art, aspects of the present disclosure may be embodied as a system, method or computer program product. Accordingly, aspects of the present disclosure, in particular in form of the controller, may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure, such as the read and write methods, may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

The invention claimed is:

1. A magnetic tape media for storing data, comprising:
   at least one servo band extending along the magnetic tape media and comprising servo information for allowing a determination of a lateral deviation of a servo reader reading the servo information from a lateral reference position on the servo band;
   additional information integrated into the servo information, which additional information is encoded by an M-ary alphabet A comprising M>2 different symbols, is arranged in a set of words, wherein each of the M>2 different symbols represents a distinct binary number consisting of a same number of bits and wherein each word of the set of words contains:
   synchronization information, wherein each symbol used for representing the synchronization information is from a set B of m symbols, which set B is a proper subset of the symbols in the alphabet A such that 1≤m<M;
   longitudinal position information, wherein each symbol used for representing the longitudinal position information is from a set C of M-m symbols, which set C is a complementary set to set B; and
   other information, wherein each symbol used for representing the other information is from the set C of M-m symbols.

2. The magnetic tape media according to claim 1, wherein:
   each word of the set of words contains a number of p symbols Si with 0≤i<p and p>0 for representing the synchronization information, which synchronization information represents a reference position within the each word;
   each word of the set of words contains a number of k symbols Li with 0≤i<k and k>0 for representing longitudinal position information, which longitudinal position information allows for deriving a present longitudinal position on the magnetic tape media;
   each word of the set of words contains a number of j symbols Ti with 0≤i<j and j>0 for representing other information; and
   the set C is the complementary set to set B in that the alphabet A is the union of the symbols in the sets B and C, and the intersection of the symbols in the sets B and C is an empty set.

3. The magnetic tape media according to claim 2, wherein the symbols L0, . . ., Lk-1, represent a longitudinal position value LPOS at time n according to:

$$LPOS(n) = \sum_{i=0}^{k-1} L_i(n)(M-m)^i.$$

4. The magnetic tape media according to claim 2, wherein the symbols L0, . . ., Lk-1 represent a longitudinal position value in a compressed format with k<k1 and k1 being a number of symbols L0, . . ., Lk1-1 representing a longitudinal position value LPOS in an uncompressed format at time n according to:

$$LPOS(n) = \sum_{i=0}^{k1-1} L_i(n)(M-m)^i.$$

5. The magnetic tape media according to claim 2, wherein the symbols L0, . . ., Lk-1 represent a longitudinal position value in an error correction encoded format with k>k2 and k2 being a number of symbols L0, . . ., Lk2-1 representing a longitudinal position value LPOS in format without error correction coding applied, at time n according to:

$$LPOS(n) = \sum_{i=0}^{k2-1} L_i(n)(M-m)^i.$$

6. The magnetic tape media according to claim 5, wherein the symbols L0, . . ., Lk-1 comprise q symbols required for the error correction encoding of the longitudinal position information and the other information.

7. The magnetic tape media according to claim 2, wherein the symbols L0, . . ., Lk-1 represent a longitudinal position value in a compressed and error correction encoded format.

8. The magnetic tape media according to claim 1, wherein:
   the servo information is organized in servo frames which servo frames repeat along the servo band;
   each servo frame comprises a set of servo bursts; and
   each servo burst comprises a set of parallel stripes each stripe being represented by two magnetic transitions, which stripes are inclined with respect to a lateral axis of the tape storage media orthogonal to its longitudinal extension.

9. The magnetic tape media according to claim 8, wherein:
   a single symbol is encoded per servo frame;
   the single symbol is encoded in at least one servo burst out of the set of servo bursts; and
   the encoding of the symbol includes a position modulation of at least one stripe out of the set of stripes of the at least one servo burst.

10. The magnetic tape media according to claim 9, wherein the encoding of different symbols out of the alphabet A includes a position modulation of the at least one stripe in different positions with respect to a default position of the at least one stripe.

11. The magnetic tape media according to claim 9, wherein:
   the servo frame comprises four servo bursts;
   the stripes of consecutive servo bursts are inclined with a positive and a negative angle with respect to the lateral axis;
   the symbol encoded in the servo frame is encoded in two neighboring servo bursts; and
   two stripes per servo burst are encoded per symbol, which two stripes are the second and the fourth stripe in the set of stripes comprising five stripes.

12. A method for encoding a magnetic tape media, the method comprising:
   writing servo information to one or more servo bands of the magnetic tape media, using at least one servo band extending along the magnetic tape media, the servo information configured allow determination of a lateral deviation of a servo reader reading the servo information from a lateral reference position on the servo band; and
   integrating additional information into the servo information, which additional information is encoded by an M-ary alphabet A comprising M>2 different symbols, is arranged in a set of words, wherein each of the M>2 different symbols represents a distinct binary number consisting of a same number of bits and wherein each word of the set of words contains:
   synchronization information, wherein each symbol used for representing the synchronization information is from a set B of m symbols, which set B is a proper subset of the symbols in the alphabet A such that 1≤m<M;
   longitudinal position information, wherein each symbol used for representing the longitudinal position information is from a set C of M-m symbols, which set C is a complementary set to set B; and
   other information, wherein each symbol used for representing the other information is from the set C of M-m symbols.

13. A method for reading servo information from a magnetic tape media, comprising:
   determining a lateral deviation of a servo reader reading the servo information from a lateral reference position on the servo band;
   repositioning the servo reader on the lateral reference position by repositioning a tape head comprising the servo reader;
   demodulating additional information read by the servo reader; and
   decoding a longitudinal position value out of the synchronized additional information;
   wherein the additional information is encoded by an M-ary alphabet A comprising M>2 different symbols, is arranged in a set of words, wherein each of the M>2 different symbols represents a distinct binary number consisting of a same number of bits and wherein each word of the set of words contains:
   synchronization information, wherein each symbol used for representing the synchronization information is from a set B of m symbols, which set B is a proper subset of the symbols in the alphabet A such that 1≤m<M;
   longitudinal position information, wherein each symbol used for representing the longitudinal position information is from a set C of M-m symbols, which set C is a complementary set to set B; and
   other information, wherein each symbol used for representing the other information is from the set C of M-m symbols.

14. An apparatus for writing servo information to a magnetic tape media, comprising:
   a servo writer for writing servo information to the magnetic tape media, and
   a control unit for actuating the servo writer to write to the magnetic tape media according to the method of claim 12.

15. An apparatus for reading servo information from a magnetic tape media, comprising:
   a servo reader for reading servo information from the magnetic tape media, and
   a controller for implementing the method of claim 13.

16. A computer program product comprising a non-transitory computer readable storage medium having computer readable program instructions stored thereon that, when executed cause the computer readable program code comprising instruction to perform a method according to claim 12.

* * * * *